Nov. 7, 1939.                J. EATON                2,179,285
                      TEMPERATURE CONTROL DEVICE
                          Filed June 3, 1938
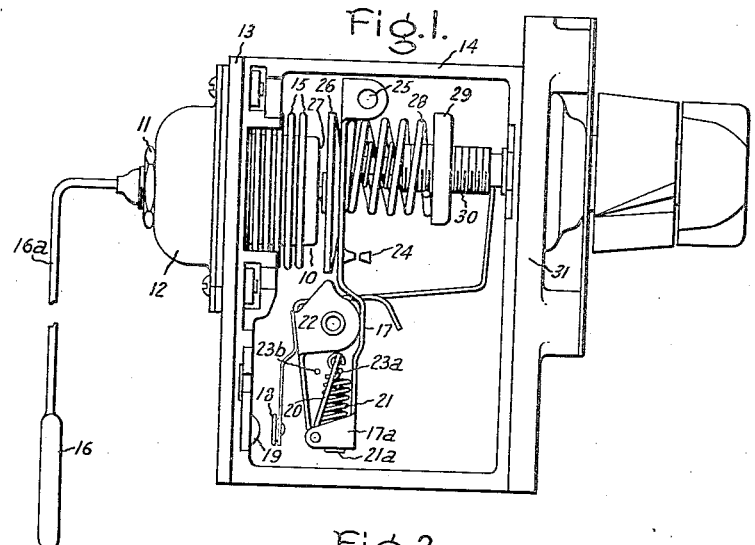
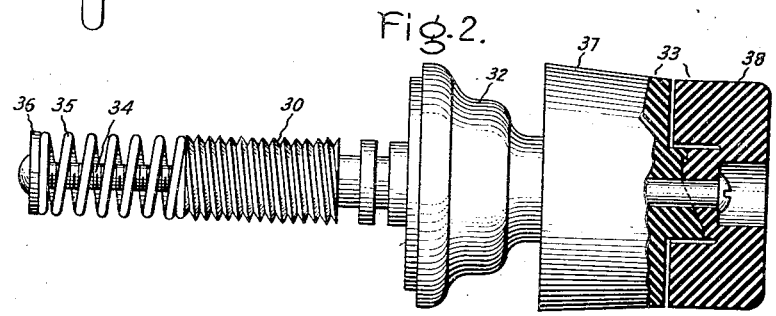
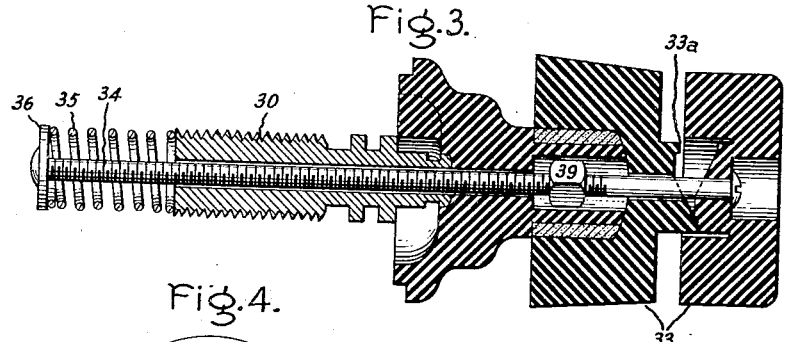
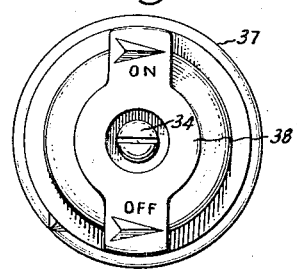
Inventor:
John Eaton,
by Harry E Dunham
His Attorney.

Patented Nov. 7, 1939

2,179,285

UNITED STATES PATENT OFFICE 2,179,285

TEMPERATURE CONTROL DEVICE

John Eaton, Schenectady, N. Y., assignor to General Electric Company, a corporation of New York Application June 3, 1938, Serial No. 211,591

9 Claims. (Cl. 62—4)

My invention relates to temperature control devices, more particularly to temperature control devices utilizing expansible bellows, and has for its object the provision of a simple, effective and inexpensive means for manually changing the operating characteristics of a bellows control.

My invention is particularly applicable to expansible bellows controls used in controlling the operation of refrigerators. For maintaining an average mean temperature in a refrigerator between a given temperature differential, the expansion and contraction of the bellows is used in connection with switching means. This average refrigerator temperature can be adjusted within a predetermined temperature range by providing a temperature control means actuated by a knob. For defrosting the refrigerator to increase the efficiency of operation from time to time, it is desirable further to provide auxiliary means, over and above those provided by the aforementioned temperature control means, for raising the upper temperature limit of the control device.

Accordingly, I have provided a simple auxiliary means which may cooperate with the temperature range control and be in the form of a double pyramided knob by which the refrigerator may be adjusted for various temperatures in its predetermined range and by which the refrigerator may also be set for defrost. The auxiliary means is so arranged that it will only affect the upper temperature limit of the temperature differential between which the control operates. In this way, when the refrigerator is set for defrost, the temperature limits of the cycle of operation, assuming a normal operation setting to be between the limits such as 37 degrees F. and 47 degrees F. refrigerator temperature, may be changed to the limits of 37 degrees F. and 60 degrees F. A wide cycle of operation is thereby provided without affecting the lower temperature limit, that is, during the defrosting cycle the refrigerator temperature is brought down to its normal low value and then is allowed to increase to a high defrost temperature before the cycle is repeated. The refrigerator may be operated on the wide defrost cycle for a considerable time without spoilage of the food therein, and the operator is granted respite from the damage which would ordinarily occur from forgetfulness in defrosting for too long a period.

For a more complete understanding of my invention, reference should be now had to the accompanying drawing in which Fig. 1 is an elevational view of an embodiment of my invention as applied to a refrigerator control switch; Fig. 2 is an enlarged elevational view partly in section of my attachment in a defrost position; Fig. 3 is a sectional elevational view of my attachment in the normal position; and Fig. 4 is a right side view of Fig. 2 showing the pyramided knob.

Referring now to the drawing, I have shown my invention in one form as applied to an expansible bellows 10 secured at one end by a lock nut 11 to a metal cap 12 supported on an end wall 13 of a refrigerator control switch housing 14. The bellows, formed from a thin walled tube, is provided with a plurality of corrugations 15 to give it resiliency and to permit longitudinal expansion and contraction of the bellows in response to variations in pressure. As applied to a refrigerator, a bulb 16 filled with a suitable vaporizable fluid, for example, methyl chloride, and secured to the evaporator (not shown) is connected by a conduit 16a to the bellows. The methyl chloride fluid produces a vapor pressure proportional to the temperature of the evaporator within the permanently closed system formed by the bulb, the conduit, and the bellows. As shown in Fig. 1, the bellows 10 has moved a switch operating member 17 to an off position to separate a movable contact 18 from a stationary contact 19.

Although my invention is applicable to any suitable switch mechanism, I prefer to use an over-center spring arrangement described as follows: The mechanism may consist of a U-shaped link 20 pivoted at its ends to the end 17a of the switch member 17. An over-center spring 21, connected at one end to the closed end of the link 20 and at its other end to an extension 21a of a pivoted contact supporting member 22 serves to operate the contact 18 between open and closed circuit positions with a snap action. Suitable stops 23a and 23b are provided to limit the movement of the link 20, while a stop 24 limits the movement of the switch member 17 around its pivot 25. Preferably the stop 24 located fairly close to the bellows and in a transverse plane taken through the center of the bellows is arranged to resist directly the load imposed on the member 17 by an excessive bellows pressure.

Continuing with the description of my invention, a member or bellows attachment 26 of the type disclosed and claimed in Letters Patent No. 2,050,883 to Ford, dated August 11, 1936, may be provided between the switch-operating arm 17 and the operating face 27 of the bellows 10 to prevent effectively more than a predetermined lateral deformation of the bellows. For resisting the movement of the bellows 10 in the direction of expansion, I provide a temperature control spring 28 supported between the operating arm 17 and a threaded spring seat 29. By mounting the threaded spring seat 29 on an adjusting screw 30 projecting through the front wall 31 of the housing 14, the temperature setting of the control device may be varied somewhat.

Referring to Fig. 2, for purposes of defrosting, it is necessary to provide means for additionally loading the bellows as it seeks to expand, to raise the upper temperature limit of the refrigeration cycle. Extending through a bolt hole provided therefor in the hollow screw member 30, the connecting member 32 attached to the screw member 30, and the double knob 33 is a tension rod or shaft 34. Encircling the operating end of the tension rod 34 is a helical compression spring 35 supported between a spring seat 36 at the end of the rod 34 and the end of the screw member 30. The rod 34 is slidable in the bolt hole against the compression forces of the spring 35 and is adapted to resist the movement of the expanding bellows 10 in a manner to be explained hereinafter.

The double or pyramided knob 33 consists of a rotatable temperature control knob 37 attached to the screw member 30 for adjustment of the temperature setting of the bellows 10 and a defrost knob 38 disposed longitudinally adjacent the end of the control knob 37. The knobs 37 and 38 are normally rotatable together, each knob being provided with an axially inclined cam face in locked engagement with a corresponding cam face on the other. The knobs are preferably locked or latched together by one or more projections 33a on one knob which seats in a corresponding recess in the other knob. By lifting the defrost knob 38 out of its lower locked position (as shown in Fig. 2), it may be rotated relative to the control knob 37 and left resting locked in a spaced relation to the control knob (as shown in Fig. 3). This compresses the spring 35, removing the end of the shaft 34 from engagement with the operating member 17. For effecting defrost or not as desired, the shaft 34 may be moved slidably in or out of the path of expansion of the bellows 10. The respective cams and projections serve to effectively lock the knobs 37 and 38 together under tension of the spring 35 both when the knobs are in close relationship as adjusted for defrost, as well as when in a spaced apart relationship for normal operation. The normal operating position of the knobs is best illustrated in Fig. 3 and the defrost position best illustrated in Fig. 2 with the shaft 34 extended for contact with the operating member 17 as the bellows 10 expands.

Threaded on the tension shaft 34, I have provided a travel limiting or tension adjusting nut 39 for limiting the extension of the shaft 34 in the defrost position of the attachment. By means of the nut 39 which is arranged to abut on the connecting member 32, a factory adjustment may be made to adjust the extension of the shaft 34 in its extended position for setting the high temperature limit of the control on defrost.

In operation of the refrigerator as the temperature of the bulb 16 rises, for example, from 16 degrees F. to 26 degrees F., the bellows 10 expands and asserts a force on the switch member 17 sufficiently to move it against the opposing bias of the temperature control spring 28 pressing against the member 17. The normal movement of the bellows is very small, of the order of $\tfrac{1}{32}''$, but it is sufficiently great to cause the member 17 to carry the over-center spring 21 past a dead center position. Thereupon, the spring 21 operates the movable contact 18 into engagement with the stationary contact 19. The refrigerator apparatus then functions to cool the refrigerator, the bellows pressure decreasing with the fall in the refrigerator temperature. When the bulb temperature is returned to a predetermined value, for example, 13 degrees F., the spring 28 moves the arm 17 to open the switch and stop the operation of the cooling apparatus. As stated hereinbefore, it is possible to vary the spring force of the spring 28 by rotating the temperature control knob 37 to adjust the temperature range of the refrigerator cycle. Although the mean average temperature of the refrigerator will be varied, the temperature differential between the high and low temperature limits remains approximately the same.

With the defrost knob 38 held out in a spaced relation to the temperature control knob 37, the control operates substantially as described above. Should it be desired to defrost the refrigerator, the defrost knob 38 may be lifted slightly, rotated, and dropped to the defrost position (shown in Fig. 2) in close relation with the knob 37. The shaft 34 then slides into a position adjacent the operating arm 17 ready to load the bellows 10 as the bellows approaches its normal expanded condition. The resisting force of the biased shaft 34 is picked up by the bellows 10 before it has expanded sufficiently to cause the contacts 18 and 19 to engage. Because of the additional loading of the biased shaft 34 on the bellows 10, the bulb 16 and, therefore, the refrigerator will rise to a higher temperature than the normal upper limit. During this period of elevated temperature, defrosting accordingly occurs.

When the pressure in the bulb 16 has risen sufficiently to increase the pressure in the bellows 10 and cause the bellows to expand a predetermined amount against the loading of both of the springs 28 and 35, the contacts 18 and 19 are closed, and the refrigeration apparatus begins a cooling cycle that returns the temperature of the refrigerator to the lower limit normally achieved with the given setting of the temperature control knob 37. The travel limiting nut 39 prevents the shaft 34 from following the bellows 10 as it contracts upon cooling beyond a predetermined point. The spring load of the defrost spring 35 is thereby removed from the bellows 10 and does not affect the lower temperature limit of the refrigeration cycle for which the control is set.

Although I prefer to position the defrost attachment on the axial line of the temperature control spring 28 so that the rod 34 and the spring 35 are encircled thereby, it is obvious that this attachment may be positioned elsewhere. While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A defrosting attachment for an expansible bellows-operated refrigerator control comprising a shaft slidable longitudinally along the path of expansion of the bellows between two positions in and out of operative relation with the bellows.

a knob on one end of said shaft having a cam face, a relatively fixed cam cooperating with said first mentioned cam, said cams enabling said shaft to be slidably moved in and out of the path of expansion of said bellows, and a helical spring encircling said shaft disposed for biasing said shaft to oppose the expansion of the bellows when said shaft is in operative relation therewith.

2. A defrosting attachment for an expansible bellows-operated refrigerator control comprising a rod slidable longitudinally along the path of expansion of the bellows between two positions in and out of operative relation with the bellows, a knob on one end of said shaft having a cam face, a relatively stationary cam cooperating with said first mentioned cam, said cams enabling said shaft to be held in either of said positions after slidable movement in and out of the path of expansion of said bellows, a helical spring encircling said shaft disposed for biasing said shaft to oppose the expansion of the bellows when said shaft is in operative relation therewith, and means including a nut threaded on said shaft for adjusting the length of the shaft when said shaft is in said operative relation for permitting the bellows to expand a predetermined amount before being opposed by said spring biased shaft.

3. A refrigerator control switch comprising an adjustment means including a rotatable control knob for raising and lowering the operating range of said switch, a defrost knob in axial alignment with said control knob arranged for manual reciprocation relative to said control knob, means including a reciprocal shaft operable by said defrost knob for effecting a condition of defrost by raising the upper limit of said operating range of said switch, and means including a pair of cooperating cams on adjoining faces of said knobs for causing said knobs to be rotatable together and for holding said shaft in an inoperative position until manually reciprocated to an operative position.

4. The combination with a refrigerator control of an expansible bellows for effecting cyclic operation of the control between predetermined temperature limits, a loading spring for said bellows, threaded means for adjusting the loading of said spring for varying said temperature limits, a rotatable temperature control knob for turning said threaded means, a defrosting knob in axial alignment with and adjacent said control knob, a rod projecting through said knobs carrying said defrosting knob at one end and having a helical spring encircling the other end for tensioning said rod, said rod being slidable between two positions in and out of operating relation with said bellows for additionally loading said bellows in a first of said positions for effecting a condition of defrost, and means including a projection on one of said knobs and a cooperating surface on the other of said knobs whereby said defrosting knob may be held in a spaced relation to said control knob to maintain said rod in a second of said positions out of operating relation with said bellows.

5. The combination with a bellows operated refrigerator control of an expansible bellows, a loading spring for said bellows, threaded means for adjusting the loading of said spring on said bellows, a rotatable temperature control knob for regulating said threaded adjusting means, additional loading means for said bellows for effecting a condition of defrost including a rod slidable from a first position in an operating relation with said bellows to a second position, said rod having a helical spring encircling the operating end thereof for biasing said rod toward said bellows, said spring and said rod being encircled by said loading spring, the other end of said rod projecting axially through said control knob and carrying a defrosting knob adjacent thereto, said knobs being provided with cooperating adjacent faces for permitting said rod to be manually reciprocated and held in either of said positions.

6. The combination with a bellows operated refrigerator control of an expansible bellows, a loading spring for said bellows, threaded means for adjusting the loading of said spring on said bellows, a rotatable temperature control knob for regulating said threaded adjusting means, additional loading means for said bellows for effecting a condition of defrost including a rod slidable from a first position in an operating relation with said bellows to a second position, said rod having a helical spring encircling the operating end thereof for biasing said rod toward said bellows, said spring and said rod being encircled by said loading spring, the other end of said rod projecting axially through said control knob and carrying a defrosting knob adjacent thereto, said knobs being provided with cooperating adjacent faces for permitting said rod to be manually reciprocated and held in either of said positions, and means including a nut threaded on said rod for adjusting the distance along which said rod is slidable from said second position to said first position.

7. The combination with a refrigerator control of an expansible bellows for effecting a cyclic operation of the control between predetermined temperature limits, a loading spring for said bellows, threaded means for adjusting the loading of said spring on said bellows, a rotatable temperature control knob for regulating said threaded adjusting means, additional loading means for said bellows for effecting a condition of defrost including a rod slidable from a first position in an operating relation with said bellows to a second position, said rod having a helical spring encircling the operating end thereof for biasing said rod toward said bellows, said spring and said rod being encircled by said loading spring, the other end of said rod projecting axially through said control knob and carrying a defrosting knob adjacent thereto by which said rod may be moved longitudinally, said knobs having cooperating projections and recessed surfaces on the inner faces thereof whereby said knobs are rotatable together and whereby said rod may be held after longitudinal movement in either of said positions.

8. An attachment for changing the operating characteristics of an expansible bellows comprising a member slidable in an axial direction between a first position in operating relation with said bellows and a second position out of operating relation with said bellows, a spring biasing said member toward said first position to load said bellows, said member when in said first position being slidable in the direction of said second position during the expansion of said bellows, and means including a knob on one end of said sliding member and a co-operating cam element to hold said sliding member in said second position, said knob when released from said cam element permitting said slidable member to move toward said first position for loading said bellows.

9. An attachment for changing the operating characteristics of an expansible bellows comprising a member slidable in an axial direction between a first position in operating relation with said bellows and a second position out of operating relation with said bellows, a spring biasing said member toward said first position to load said bellows, said member when in said first position being slidable in the direction of said second position during expansion of said bellows, and means including a knob on one end of said sliding member and a co-operating cam element to hold said sliding member in said second position, said knob when released from said cam element permitting said slidable member to move toward said first position for loading said bellows, and means including an element threaded on said slidable member for adjusting the point at which said bellows is loaded and unloaded when said member is in said first position.

JOHN EATON.